US012600062B2

(12) United States Patent
Breyer

(10) Patent No.: US 12,600,062 B2
(45) Date of Patent: Apr. 14, 2026

(54) METHOD AND DEVICE FOR DETACHING A STAMP

(71) Applicant: EV Group E. Thallner GmbH, St. Florian am Inn (AT)

(72) Inventor: Robert Breyer, Munzkirchen (AT)

(73) Assignee: EV GROUP E. THALLNER GMBH, St. Florian am Inn (AT)

( * ) Notice: Subject to any disclaimer, the term of this patent is extended or adjusted under 35 U.S.C. 154(b) by 416 days.

(21) Appl. No.: 17/762,411

(22) PCT Filed: Dec. 2, 2019

(86) PCT No.: PCT/EP2019/083339
§ 371 (c)(1),
(2) Date: Mar. 22, 2022

(87) PCT Pub. No.: WO2021/110237
PCT Pub. Date: Jun. 10, 2021

(65) Prior Publication Data
US 2022/0339825 A1     Oct. 27, 2022

(51) Int. Cl.
*B29C 33/38* (2006.01)
*B29C 59/02* (2006.01)

(52) U.S. Cl.
CPC .......... *B29C 33/3842* (2013.01); *B29C 59/02* (2013.01)

(58) Field of Classification Search
CPC ... G03F 7/0002; B29C 59/00; B29C 33/3842; B29C 33/3875; B29C 33/3878; B29C 33/3885; B29C 33/3892
See application file for complete search history.

(56) References Cited

U.S. PATENT DOCUMENTS

| | | | |
|---|---|---|---|
| 10,095,117 B2 | 10/2018 | Hamaya et al. | |
| 10,627,715 B2 | 4/2020 | Choi | |
| 10,766,169 B2 | 9/2020 | Matsumoto et al. | |
| 11,143,957 B2 | 10/2021 | Choi | |
| 2006/0172553 A1* | 8/2006 | Choi ................... | H01L 21/6838 |
| | | | 438/780 |
| 2007/0126150 A1 | 6/2007 | GanapathiSubramanian et al. | |
| 2011/0217479 A1* | 9/2011 | Yamashita ............. | B82Y 40/00 |
| | | | 118/620 |
| 2013/0049255 A1 | 2/2013 | Matsumoto et al. | |
| 2014/0110879 A1 | 4/2014 | O'Hare et al. | |

(Continued)

FOREIGN PATENT DOCUMENTS

| | | |
|---|---|---|
| CN | 105137714 A | 12/2015 |
| CN | 105584030 A | 5/2016 |

(Continued)

OTHER PUBLICATIONS

International Search Report from corresponding International Patent Application No. PCT/EP2019/083339, dated Aug. 10, 2020.

(Continued)

*Primary Examiner* — Susan D Leong
(74) *Attorney, Agent, or Firm* — RENNER, OTTO, BOISSELLE & SKLAR, LLP

(57) ABSTRACT

The invention relates to a method for detaching a stamp from a substrate, in particular from a master stamp and/or from a product. The stamp is deformed in a direction of the substrate in order to detach the stamp from the susbtrate.

1 Claim, 4 Drawing Sheets

(56) References Cited

U.S. PATENT DOCUMENTS

| | | | |
|---|---|---|---|
| 2015/0069672 A1* | 3/2015 | Zhang | B82Y 40/00 |
| | | | 264/571 |
| 2015/0293442 A1* | 10/2015 | Kreindl | G03F 7/0015 |
| | | | 101/32 |
| 2016/0129612 A1 | 5/2016 | Seki et al. | |
| 2018/0117805 A1 | 5/2018 | Choi | |
| 2018/0207841 A1 | 7/2018 | Matsumoto et al. | |
| 2019/0176500 A1* | 6/2019 | Lindner | B41K 3/14 |
| 2020/0225575 A1 | 7/2020 | Choi | |
| 2022/0032507 A1* | 2/2022 | Kuwahara | B29D 11/0073 |
| 2022/0339825 A1* | 10/2022 | Breyer | B29C 59/02 |

FOREIGN PATENT DOCUMENTS

| | | | |
|---|---|---|---|
| CN | 108020986 A | 5/2018 |
| JP | 2010234669 A | 10/2010 |
| JP | 2011-207221 A | 10/2011 |
| JP | 2016096327 A | 5/2016 |
| JP | 2017-092396 A | 5/2017 |
| JP | 2018-074159 A | 5/2018 |
| KR | 20060064609 A | 6/2006 |
| WO | WO-2011/111741 A1 | 9/2011 |
| WO | WO-2012/165310 A1 | 12/2012 |
| WO | WO-2017/059828 A1 | 4/2017 |
| WO | WO-2017/086246 A1 | 5/2017 |

OTHER PUBLICATIONS

Notification of Reasons for Refusal issued in related Japanese Patent Application No. 2022-523346 dated Dec. 12, 2023 along with English-language translation.

First Office Action issued in related Chinese Patent Application No. 201980101542.9 dated Mar. 13, 2025.

Notice of Comment issued in related Korean Patent Application No. 10-2022-7013156 dated Feb. 12, 2025.

Notification of Reasons for Refusal issued in related Japanese Patent Application No. 2025-023814 dated Dec. 2, 2025.

\* cited by examiner

METHOD AND DEVICE FOR DETACHING A STAMP

FIELD OF THE INVENTION

The invention describes a method and a device for detaching a stamp.

BACKGROUND OF THE INVENTION

The state of the art comprises different systems and methods for the production of stamps and for their use. The stamps are roughly divided into hard stamps and/or soft stamps. Film stamps are a specific type of soft stamp consisting of a relatively thin film, to which stamping structures are applied. The film and stamping structures form the soft stamp. The use of soft stamps is particularly preferred in the state of the art. Admittedly soft stamps wear faster than hard stamps, but can be replicated very quickly. A very expensive and precision-made hard stamp is used as the master stamp, from which the soft stamp is produced as a negative. This soft stamp then becomes the so-called working stamp. The product embossing materials, from which the products as such are to be stamped, are then manufactured using only the soft stamp, whilst the hard stamp is kept safe and stored away in a protected manner. Nevertheless, a frequently occurring problem in the state of the art remains that of detaching the soft stamp from the master stamp/the product embossing material.

Hard stamps last a long time, but suffer from the disadvantage of being relatively difficult to detach, without risking the at least partial destruction of the structures in the nanometre and/or micrometre range. Soft stamps on the other hand wear down very quickly. The fact that they are easy to detach is above all the result of their elasticity and very low bending resistance. Both properties make it possible to pull the soft stamp off or at least bend it to such an extent that it can be pulled off the embossing material sequentially, i.e. in steps. However, the soft stamps comprise extremely low hardness values and therefore wear relatively quickly. Therefore new stamps have to be continuously remoulded from the master stamp.

SUMMARY OF THE INVENTION

It is therefore a requirement of the invention, to remove the disadvantages of the state of the art and in particular to alleviate detaching of the stamp (=soft stamp), also called working stamp hereunder, from the master stamp (=hard stamp) and/or the embossing material.

This object is achieved using the features of the claims. Further, the scope of the invention also encompasses all combinations of at least two features given in the description, the claims and/or the figures. Where value ranges are mentioned, values within the said limits are also deemed to have been disclosed as limit values and claimed in random combination.

The inventive stamp (=soft stamp) in particular comprises the following characteristics/the following material:

Polydimethylsiloxane (PDMS)
Perfluoropolyether (PFPE)
Polyhedrales oligomeric silsesquioxane (POSS)
Polydimethylsiloxane (PDMS)
Tetraethyl orthosilicate (TEOS)
Poly(organo)siloxane (silicone)

The inventive stamp (=soft stamp) may in principle originate from one of the following material classes Thermoplastic
Elastomer
Duroplast.

The master stamp, the embossing material and the product are also called substrate hereunder.

The invention relates to a method for detaching a stamp from a substrate, in particular from a master stamp, an embossing material, and/or a product, wherein the stamp is deformed in direction of the substrate, in order to detach the stamp from the substrate.

Further the invention relates, in particular as an autonomous subject of the invention, to a method for manufacturing a stamp on a carrier, comprising the following steps, in particular the following sequence:

applying an embossing material to a master stamp,
bringing the embossing material into contact with the carrier,
hardening the embossing material,
detaching the master stamp from the hardened embossing material, wherein the stamp produced remains on the carrier, in particular with a method according to one of the preceding types of claim, wherein the carrier is deformed in direction of the master stamp in order detach the master stamp from the stamp.

Further the invention relates, in particular as an autonomous subject of the invention, to a method for manufacturing a product from an embossing material, comprising the following steps, in particular the following sequence:

bringing the embossing material into contact with a stamp,
hardening the embossing material,
detaching the stamp from the embossing material, in particular with a method according to one of the preceding types of claim, wherein the stamp is deformed in direction of the product, in order to detach the stamp from the product.

Further the invention relates, in particular as an autonomous subject of the invention, to a device for detaching a stamp from a substrate, in particular from a master stamp, an embossing material and/or a product, wherein the stamp is deformable in direction of the substrate, in order to detach the stamp from the substrate.

Further the invention relates, in particular as an autonomous subject of the invention, to a device for manufacturing a stamp on a carrier, in particular with a method according to one of the preceding types of claim, comprising:

application means for applying an embossing material to a master stamp,
contacting means for bringing the embossing material into contact with the carrier,
hardening means for detaching the master stamp from the hardened embossing material, wherein the stamp produced remains on the carrier, wherein the carrier is deformable in direction of the master stamp, in order to detach the master stamp from the stamp.

Further the invention relates, in particular as an autonomous subject of the invention, to a device for manufacturing a product from an embossing material, contacting means for bringing the embossing material into contact with a stamp,
hardening means for hardening the embossing material,
detaching means for detaching the stamp from the embossing material, wherein deforming means for deforming the stamp in direction of the product are provided in order to detach the stamp from the product.

Preferably it is provided that the stamp and/or the carrier is/are deformed/deformable by overpressure.

Furthermore it is preferred that maximum deformation takes place in the centre of the stamp and/or the carrier, wherein in particular deformation takes place symmetrically to the centre of the stamp and/or the carrier.

Furthermore it is preferred that deformation of the stamp and/or the carrier takes place from inside to outside, in particular from the centre of the stamp and/or the carrier towards the edge of the stamp and/or the carrier.

Furthermore it is preferred that for the purpose of detachment the substrate and the stamp and/or the carrier are moved away from each other, in particular simultaneously with deforming the stamp and/or the carrier.

Furthermore it is preferred that detaching the stamp takes place from outside to inside, in particular from the edge of the stamp towards the centre of the stamp.

Furthermore it is preferred that deformation leads to a convex demoulding and/or to a bulging out of the stamp and/or the carrier.

Furthermore it is preferred that for the purpose of detaching them the master stamp and the carrier are moved away from each other, in particular simultaneously with deformation of the carrier.

Furthermore it is preferred that the carrier is a film and/or the stamp is a film stamp.

In another embodiment it is provided that the carrier is a very thin and flexible glass plate. The glass plate is in particular thinner than 20 mm, preferably thinner than 10 mm, more preferably thinner than 5 mm, even more preferably thinner than 2 mm, most preferably thinner than 1 mm.

Furthermore it is preferred that the device comprises at least one carrier form element for deforming and/or at least one stretching element for stretching the carrier, wherein the carrier is in particular tensioned via the carrier form element.

Furthermore it is preferred that the carrier form element comprises at least one carrier form element elevation, wherein the carrier form element elevation lifts the carrier off the carrier form element and/or stretches the carrier.

Furthermore it is preferred that the carrier form element comprises at least one fixing element, which serves to fix the carrier, in particular to dynamically fix the carrier, wherein preferably the at least one fixing element can be switched such that a gas and/or a gas mixture can be delivered via the at least one fixing element into an intermediate space between the carrier form element and the carrier.

Furthermore it is preferred that the at least one stretching element is a fluid element, wherein a gas and/or a gas mixture can be delivered via the fluid element, in order to generate an overpressure between the carrier form element and the carrier.

In another exemplary embodiment it is provided that instead of a carrier form element which in particular is situated behind the carrier, the carrier is held in a frame. In case of using a frame, the stretching element is nevertheless situated in the usual manner at the back of the carrier.

The core of the invention consists in particular in a fixing the stamp, which allows the stamp (=soft stamp) to be detached from the master stamp and/or the embossing material and/or the product from the edge towards the centre.

In a specific embodiment the fixing is constructed in such a way that an endless film can be used, onto which a number of stamps are placed. The endless film can in this case be fixed such that on the one hand no noticeable distortion of the stamping structures occurs and on the other hand demoulding of the stamping structures/the stamp can take place successively from outside to inside.

Demoulding is performed in particular in a controllable manner from outside to inside. The embodiment with the endless film allows using a stamping plant which can produce its soft stamps independently with the aid of a single master stamp.

A particular advantage of the inventive embodiments and processes consists in that demoulding of the stamp is not dependent on the size of the substrate and in particular on the thickness of the substrate. During the deforming process the substrate can remain fixed completely level, whilst the stamp, due to the inventive deforming, in particular due to the convex bending generated, detaches itself from the substrate, in particular demoulds sequentially from outside to inside from the substrate. This prevent the substrate from breaking.

A further advantage is the absence of an exclusion zone. Since there is no need for introducing objects like blades for performing the separation, which could destroy components and structures at the edge of the substrate, structures can be stamped right up to the very edge of the substrate.

The inventive embodiments can in principle perform the stamping on substrates of any size or shape, provided they have been designed large enough.

A further inventive advantage consists in particular in the re-usability of the carrier of the stamp. In case the structures on the carrier have been destroyed or worn down through repeated use, the carrier can be replaced or moved further along the line, in order to produce a new faultless working stamp.

A further inventive advantage in particular consists in that the stamp can be as large as the full surface of a wafer to be stamped and in that even the exclusion zone can be stamped. This is particularly due to the fact that all forming and deforming components are situated behind the stamp/the carrier of the stamp and the stamp is therefore not laterally limited by any components.

A further inventive advantage compared to the state of the art in particular consists in that the substrate to be stamped is not demoulded solely from the stamp, but preferably the stamp is demoulded from the substrate. Demoulding of the stamp from the substrate can admittedly be supported by a translational movement of the substrate away from the stamp, but in the main demoulding is based on the inventive bending of the carrier/the stamp. According to the invention this makes it possible, to stamp on very thin substrates and to subsequently demould the stamp without destroying the substrate, because the substrate can be fixed full-surface and does itself not have to be bent.

A further inventive advantage is in particular the rigid state of the stamp/the carrier during the stamping process and the flexible state of the stamp/the carrier during the demoulding process. During the demoulding process the stamp can be subjected to compressive loads, because it is stabilised by the carrier and/or by components situated behind the carrier, whilst the stamp and the carrier can deform during the demoulding process.

The demoulding behaviour of the stamp can be influenced or adjusted very simply by the thickness of the carrier. The carrier is in particular thinner than 5 mm, preferably thinner than 1 mm, more preferably thinner than 0.1 mm, even more preferably thinner than 0.01 mm, most preferably thinner than 0.001 mm.

The inventive embodiment can be used on the one hand for manufacturing the stamp and on the other hand for using the stamp for stamping processes. In contrast to the state of the art there is therefore no longer any need for two separate embodiments.

In the state of the art a carrier (also called "back plane") is very frequently used, which needs to be coated prior to manufacturing the stamp, in order to in particular ensure its adherence to the working stamp embossing material. The carriers preferred according to the invention may already have been coated when supplied, so that there is no need for the stamp manufacturer to provide for the coating, which leads to savings in terms of both cost and time.

The inventive embodiment in particular relates to a device, with the aid of which a stamp can be produced on a carrier.

The inventive devices in particular comprise at least one carrier form element, via which a carrier can be tensioned. The carrier form element preferably has at least one carrier form element elevation, which lifts the carrier stamp side of the tensioned carrier off the remaining part of the carrier form element.

The carrier form element in particular comprises at least one fixing element, which serves to fix, in particular dynamically fix the carrier. The fixing element of the carrier form element can in particular be switched on or switched off. The fixing element serves to hold the carrier in place, in particular without tension.

The one or more fixing elements may be

Vacuum fixings, in particular with
    individually controllable vacuum paths
    interconnected vacuum paths
Mechanical fixings, in particular
    clamps
Electrical fixings, in particular
    electrostatic fixings
    magnetic fixings
Adhesive fixings, in particular
    gel-pak fixings
    fixings with adhesive, in particular controllable surfaces.

The at least one fixing element is in particular electronically controllable. Vacuum fixing is the preferred type of fixing element. Vacuum fixing preferably consists of a number of vacuum paths, which exit on the surface of the carrier form element. The vacuum paths are preferably individually controllable.

With a preferred application some vacuum paths have been joined to form vacuum path segments, which can be individually controlled and can therefore be evacuated or flooded. Each vacuum segment is however independent of the other vacuum segments. This offers the possibility of constructing vacuum elements, which are individually controllable. The vacuum segments are preferably constructed in the shape of a ring. This makes it possible to achieve a fixing and/or a detachment of the substrate from the sample holder, which is targeted, radially symmetric and which in particular is carried out from inside to outside. A further preferred form of vacuum segment is in the shape of a rectangle.

The carrier form element in particular comprises at least one element for lifting the carrier off the carrier form element. Lifting the carrier off is hereunder also called stretching; the one or more elements, which cause the stretching, are also called stretching element(s). Preferably the at least one stretching element is a fluid element, via which a gas and/or gas mixture can flow out, in order to generate an overpressure between the carrier form element and the carrier.

With a most particular inventive embodiment the at least one already mentioned vacuum element, which is used for fixing, is switchable in such a manner that a gas and/or gas mixture can be pumped via the same into an intermediate space between the carrier form element and the carrier. The at least one fixing element can then be used simultaneously as a stretching element. In case other fixing elements are used, the stretching elements are provided separately and independently of the fixing elements.

The at least one carrier form element preferably comprises rounded edges, which deflect the carrier in as gentle a manner as possible. The radii of the rounded edges are larger than 0.1 mm, preferably larger than 1 mm, more preferably larger than 5 mm, even more preferably larger than 10 mm, most preferably larger than 30 mm.

The carrier is preferably fixed by means of externally engaging, in particular mechanical fixing units, which are independent of the carrier form elements, on at least two sides, in particular opposing sides.

The fixing units have in particular load cells installed in them, in order to measure and monitor the force, with which the carrier is fixed to the carrier form element. In particular damage to the carrier through the fixing units is to be avoided at all cost.

The fixing units are used in particular for roughly fixing the carrier. The force which may be brought upon the carrier by the fixing units is preferably adjustable. The applied force preferably lies between 0.001 N and 1000 N, preferably between 0.01 N and 500 N, more preferably between 0.1 N and 100 N, even more preferably between 1 N and 50 N, most preferably between 1 N and 25 N.

It is more expedient to specify the pressure, which may be applied to the carrier in order to avoid, importantly, damage to the carrier. The load values mentioned are standardised to one square metre and then result in corresponding pressure values. Pressure lies between 0.001 MPa and 1000 MPa, preferably between 0.01 MPa and 500 MPa, more preferably between 0.1 MPa and 100 MPa, even more preferably between 1 MPa and 50 MPa, most preferably between 1 MPa. and 25 MPa.

Any micro cracks developing in the carrier are completely closed by the working stamp embossing material, preferably during the manufacturing process of the working stamp.
Embossing Materials In the document hereunder a difference is made in particular between the working stamp embossing material and the product embossing material. The working stamp embossing material is an embossing material, from which the working stamp (=stamp, soft stamp) is manufactured. The product embossing material is the embossing material, which is stamped by the working stamp, in order to create the desired products.

Stamp embossing materials and product embossing materials may be different from one another. Preferably the difference between working stamp embossing material and product embossing material lies in their hydrophobicity/hydrophilicity. A measure for the hydrophobicity/hydrophilicity is the contact angle, which develops between a test liquid drop, in particular water, and the surface to be measured. Hydrophilic surfaces flatten the liquid drop, because the adhesive forces between the liquid and the surface dominate over the cohesive forces of the liquid and therefore form low contact angles. Hydrophobic surfaces lead to a more sphere-shaped form of the liquid drops, because the cohesive forces of the liquid dominate over the adhesive forces between the liquid and the surface.

A popular method for determining the hydrophobicity/hydrophilicity is the contact angle method. The contact angle method is used in conjunction with the Young equation, in order to obtain information on the surface energy of a solid body through using a test liquid. This qualifies the surface energy of a surface by means of a certain test liquid, usually by means of water. Appropriate measuring methods as well as evaluation methods are known to the expert. The contact angle ascertained with the aid of the contact angle method can be converted to a surface energy in N/m or in J/m². For relative comparisons of different surfaces given the same test liquid the contact angle details are however already sufficient, in order to obtain a relative estimate of the adhesive strength of the surface. For example, by using water as a test liquid, one can say that wetted surfaces, which create a contact angle on a drop of water of approx. 30°, have a higher adhesion than surfaces, whose contact angle at the water drop is approx. 120°.

With a preferred embodiment of the invention it is provided that the adhesive strength of the working stamp materials is defined by a surface energy of less than 0.1 J/m², in particular less than 0.01 J/m², preferably less than 0.001 J/m², more preferably less than 0.0001 J/m², ideally less than 0.00001 J/m².

Alternatively or additionally it is provided according to an advantageous embodiment of the invention that the adhesive strength of the contact surface is defined for a contact angle greater than 20°, in particular greater than 50°, preferably greater than 90°, more preferably greater than 150°. The adhesive strength of a surface with reference to another material may be determined with the aid of the above-mentioned contact angle method. A drop of a known liquid, preferably water (values according to the invention with reference to water), (alternatively glycerine or hexadecane), is dropped onto the surface to be measured. Using a microscope the angle is accurately measured from the side, i.e. the angle between the tangent on the drops and the surface.

The embossing materials used according to the invention preferably comprise a viscosity between 1 cp and 25000 cp, preferably between 10 and 25000 cp, more preferably between 100 cp and 25000 cp, even more preferably between 1000 cp and 25000 cp, most preferably between 10000 and 25000 cp.

Device

With a first preferred inventive embodiment a carrier is placed over a carrier form element. The carrier is preferably a film. The film is initially pre-fixed using dynamic carrier fixing, preferably in the form of vacuum elements. Subsequently lateral fixing takes place using static carrier fixing. This embodiment is designed for accepting trimmed films or bounded stiff carriers. The size of the carrier is in particular designed such that static carrier fixing is able to fix the carrier. This embodiment comprises at least one stretching element, with the aid of which the carrier can be stretched. Preferably the dynamic fixings are simultaneously used as stretching elements.

Another preferred inventive embodiment discloses a stamp carrier device, which uses an endless film, in order to be able to create a number of stamps along the carrier. The endless film is preferably supplied as a roll and mounted on a first shaft. A second shaft allows winding and unwinding of a protective film from the endless film. The endless film can be guided over further elements and is guided between a first static carrier fixing and the carrier form element. The endless film passes through the static carrier fixing and the second static carrier fixing and is finally wound onto a third shaft.

The static carrier fixings consist of fixing units, which are movable and in particular can clamp the endless film to the carrier form element. This prevents any displacement of the endless film. In this state that part of the endless film can then be provided with appropriate stamping structures. This embodiment comprises at least one stretching element, with the aid of which the carrier can be stretched. Preferably the dynamic fixings also serve as stretching elements.

The inventive film can be pre-tensioned with a force between 1 N and 1000 N, preferably between 2 N and 800 N, more preferably between 5 N and 600 N, even more preferably between 8 N and 400 N, most preferably between 10 N and 100 N.

The device according to the invention can, as a module, be part of a cluster. A cluster is understood to be a quantity of interconnected modules, which in particular are all connected to each other in a vacuum-tight manner, so that a substrate can be transported between the modules without coming into contact with an external atmosphere.

Each module can preferably be individually evacuated. The entire cluster can be evacuated. The pressure in each module and/or in the entire cluster can be adjusted to less than 1 bar, preferably to less than $10^{-1}$ mbar, more preferably to less than $10^{-3}$ mbar, even more preferably to less than $10^{-5}$, most preferably to less than $10^{-7}$ mbar.

The modules and/or the cluster can in particular also be flushed with gases and/or gas mixtures. The modules and/or the cluster can in particular also be placed under overpressure. In this case pressure is set between 1 bar and 5 bar, preferably between 1 bar and 4.5 bar, more preferably between 1 bar and 4 bar, even more preferably between 1 bar and 3.5 bar, most preferably between 1 bar and 3 bar.

The modules in the cluster are connected to each other in particular by a central module, in which there is preferably a robot, which can move the substrates between the charging containers (Foups) and/or the modules.

Methods

With a first preferred inventive method the carrier is fixed on an inventive device.

In a first process step a working stamp embossing material is separated from a master stamp with the aid of a separating device. Preferably the working stamp embossing material is already distributed as evenly as possible over the full surface.

In a second process step the inventive device is aligned relative to the master stamp. It is feasible for the inventive device and/or the master stamp to be moved. Preferably however, the master stamp is moved. Alignment may be carried out either mechanically and/or optically. It is feasible for the master stamp to be purely roughly positioned relative to the inventive device. Preferably however an alignment of both objects is carried out by way of the alignment marks. The alignment marks may be found on the carrier form element and/or the carrier. Preferably however they are found on the carrier.

In a third process step contact is made between the carrier and the working stamp embossing material. Due to the pressurisation the working stamp compound is flattened along the carrier, whilst the master stamp structure is moulded as a negative in the working stamp compound.

In a fourth process step the working stamp embossing material is hardened. The working stamp embossing material can be hardened either thermally and/or by means of electro-magnetic radiation.

Thermal hardening takes place between 0° C. and 500° C., preferably between 50° C. and 450° C., more preferably between 100° C. and 400° C., even more preferably between 150° C. and 350° C., most preferably between 200° C. and 300° C.

The electro-magnetic radiation has preferably a wavelength in the range between 10 nm and 2000 nm, preferably between 50 nm and 1500 nm, more preferably between 100 nm and 1000 nm, even more preferably between 150 nm and 500 nm, most preferably between 200 nm and 370 nm.

In a fifth process step the carrier with the hardened working stamp embossing material is detached from the master stamp, in that the stretching element takes care of the stretching of the carrier. A gas or gas mixture preferably flows over the dynamic carrier fixing, which consists of vacuum elements, entering between the carrier form element and the carrier and thus creating, when viewed from outside, a convexly bent carrier. The carrier therefore detaches itself from outside to inside.

In a sixth process step the carrier is again fixed by means of the dynamic carrier fixing.

With a second preferred inventive method an endless film is fixed as the carrier on the inventive device.

The first six process steps of the second method are in essence identical to the first six process steps of the first method.

In a seventh process step the fixing of the endless film is cancelled by retracting the static carrier fixing of the fixing units, in order to release the endless film. Thereafter or simultaneously the endless film is wound onto a third roll. As a result the generated working stamp embossing material is removed from the carrier form element, and a new area of the endless film is available for stamping.

It is thus very easily possible to produce a number of working stamps on an endless film.

With a third preferred inventive method the working stamp produced by one of the preceding methods is used for stamping a product embossing material. The actual products to be produced are manufactured from the product embossing material. Preferably a product embossing material is applied to a substrate and the substrate is aligned relative to the working stamp. This is then followed by the stamping operation and hardening operation as well as the demoulding operation.

BRIEF DESCRIPTION OF THE DRAWINGS

Further advantages, features and details of the invention are revealed in the description hereunder of preferred exemplary embodiments as well as by way of the drawings, in which.

DETAILED DESCRIPTION OF THE INVENTION

In the figures identical components or functionally identical components are marked with the same reference symbols.

Figure 1A:
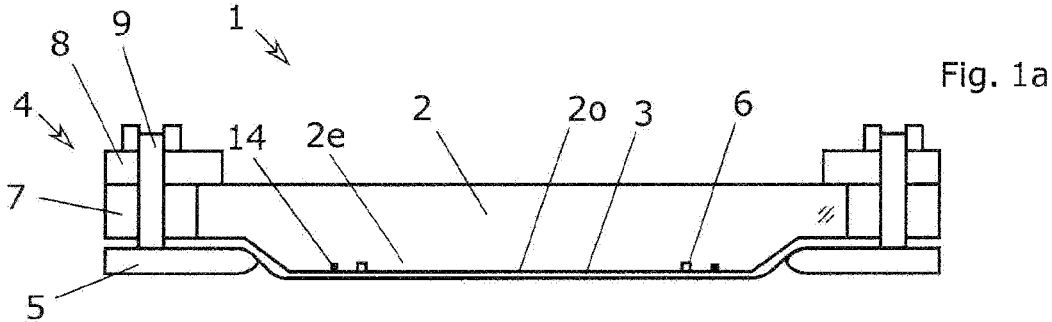
FIG. 1a shows a first inventive embodiment in a side view.

FIG. 1a shows a side view of a manual inventive first stamping device 1, which is provided with at least two fixing units 4, with the aid of which a carrier 3 can be fixed, in particular on two opposite sides. The two fixing units 4 are preferably connected to a carrier form element 2. The carrier form element 2 preferably comprises a carrier form element elevation 2e, via which the carrier 3 can be tensioned. The fixing unit 4 consists for example of a static carrier fixing 5, a distance piece 7, and a top part 8. The components 5, 7 and 8 can be releasably fixed to each other by fixing elements 9, in particular screws. The carrier form element 2 is preferably transparent for a wavelength range of an electro-magnetic radiation, which is used for hardening a working stamp embossing material. The carrier form element 2 comprises dynamic fixing elements 6 (also called dynamic carrier fixing hereunder) which can be switched on and off. The fixing elements 6 may be distributed at random across a carrier form element surface 2o. The number of used fixing elements 6 is in particular larger than 2, preferably larger than 5, more preferably larger than 10, even more preferably larger than 50, most preferably larger than 100. In an especially preferred inventive embodiment the fixing elements 6 are individually controllable. The fixing elements 6 can preferably be controlled such, that they can lead to a convex deformation of the carrier 3, when viewed from outside. This is made possible in a particularly easy manner in that the fixing elements 6 are realised as channels, which not only serve the evacuation of the intermediate space between the carrier 3 and the carrier form element 2, but can also be used for creating an overpressure. The fixing elements 6 are therefore preferably channels, via which a vacuum/an overpressure can be built. A further inventive use of the fixing elements 6 consists in that with their aid a distortion-free fixing of the carrier 3 can be achieved, before fixing of the fixing units 4 via the static fixing 5 takes place, which is afflicted with a certain amount of distortion. As a result the carrier 3 experiences very little or no distortion in the area, in which the stamp is applied in a later stamping process. The carrier 3 is clamped on the left and the right side between the outer part of the carrier form element 2 and the static carrier fixing 5. In addition alignment marks 14 are arranged on the carrier form element surface.

Figure 1B:
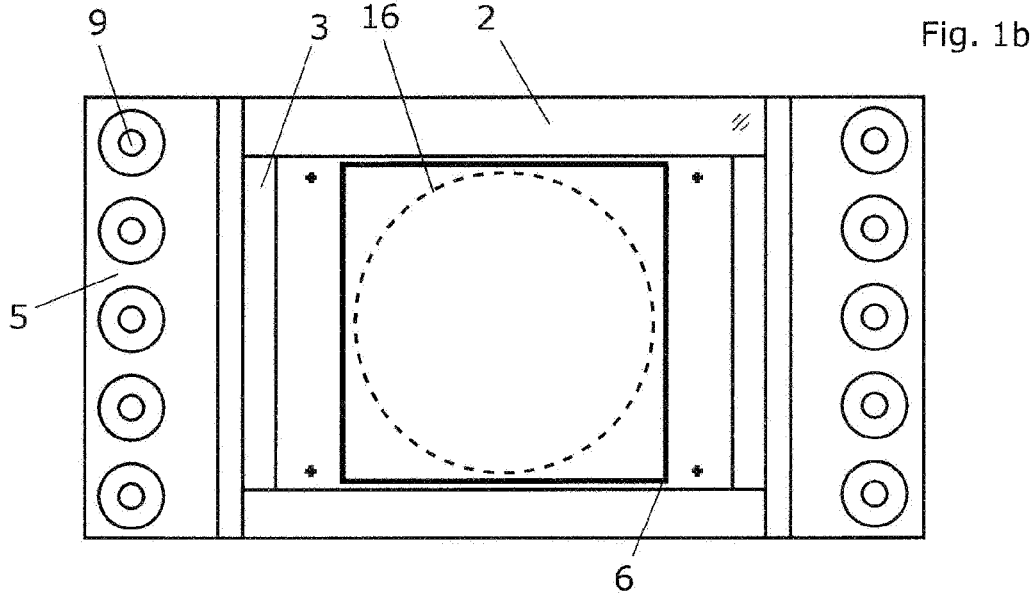
FIG. 1b shows the first inventive embodiment in a view from below.

FIG. 1b shows a view from below of the manual inventive first device 1. One can recognise the fixing elements 9, in particular screws, with which the releasable screw connection of components 5, 7 and 8 is made. The dynamic carrier fixing 6 is depicted as a single, fully circumferential, square vacuum channel. The circular-shaped area 16 represents the stamp area 16, in which the later stamp is stamped. The stamp area may of course be of any random size and shape, but is depicted as a circular shape as reference to the circular, standardised wafer shape in the semi-conductor industry.

Figures 2A, 2B, 2C, 2D:
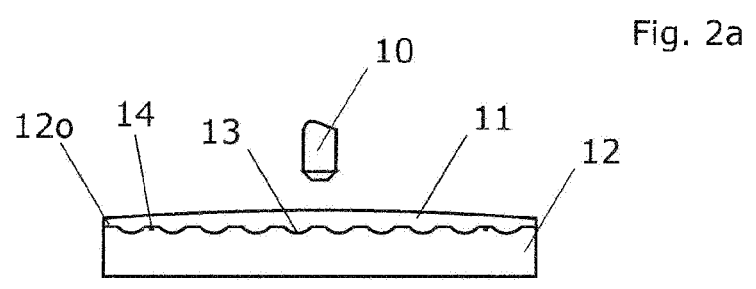
FIG. 2a shows a first process step of the first inventive process.
FIG. 2b shows a second process step of the first inventive process.
FIG. 2c shows a third process step of the first inventive process.
FIG. 2d shows a fourth process step of the first inventive process.

FIG. 2a shows a first inventive process step of a first inventive method, in which a working stamp embossing material 11 is applied via a separating device 10 onto a master stamp surface 12*o* of a master stamp 12 with a number of master stamp structures 13.

FIG. 2*b* shows a second inventive process step of a first inventive method, in which the manual inventive first stamping device 1 is aligned with the aid of alignment marks 14 relative to the master stamp 12. The alignment marks 14 of the master stamp 12 and the stamping device 1 are preferably aligned with each other by optical alignment elements 15. A purely mechanical rough alignment of the stamping device 1 relative to the master stamp 12 is also feasible, in particular without an alignment element 15 and without alignment marks 14.

FIG. 2*c* shows a third inventive process step of a first inventive method, in which the carrier 3 is brought into contact with the working stamp embossing material 11 via a carrier stamp side 3*s*. Due to the contacting the working stamp embossing material 11 is flattened.

FIG. 2*d* shows a fourth inventive process step of a first inventive method, in which the working stamp embossing material 11 is hardened. Hardening can be effected thermally, but preferably electromagnetically, in particular by means of UV light. Hardening is preferably effected by the carrier form element 2. If using electromagnetic radiation the carrier form element 2 must be sufficiently transparent in the respective wavelength range in order to obtain adequate hardening of the working stamp embossing material 11.

Figures 2E, 2F, 3A, 3B:
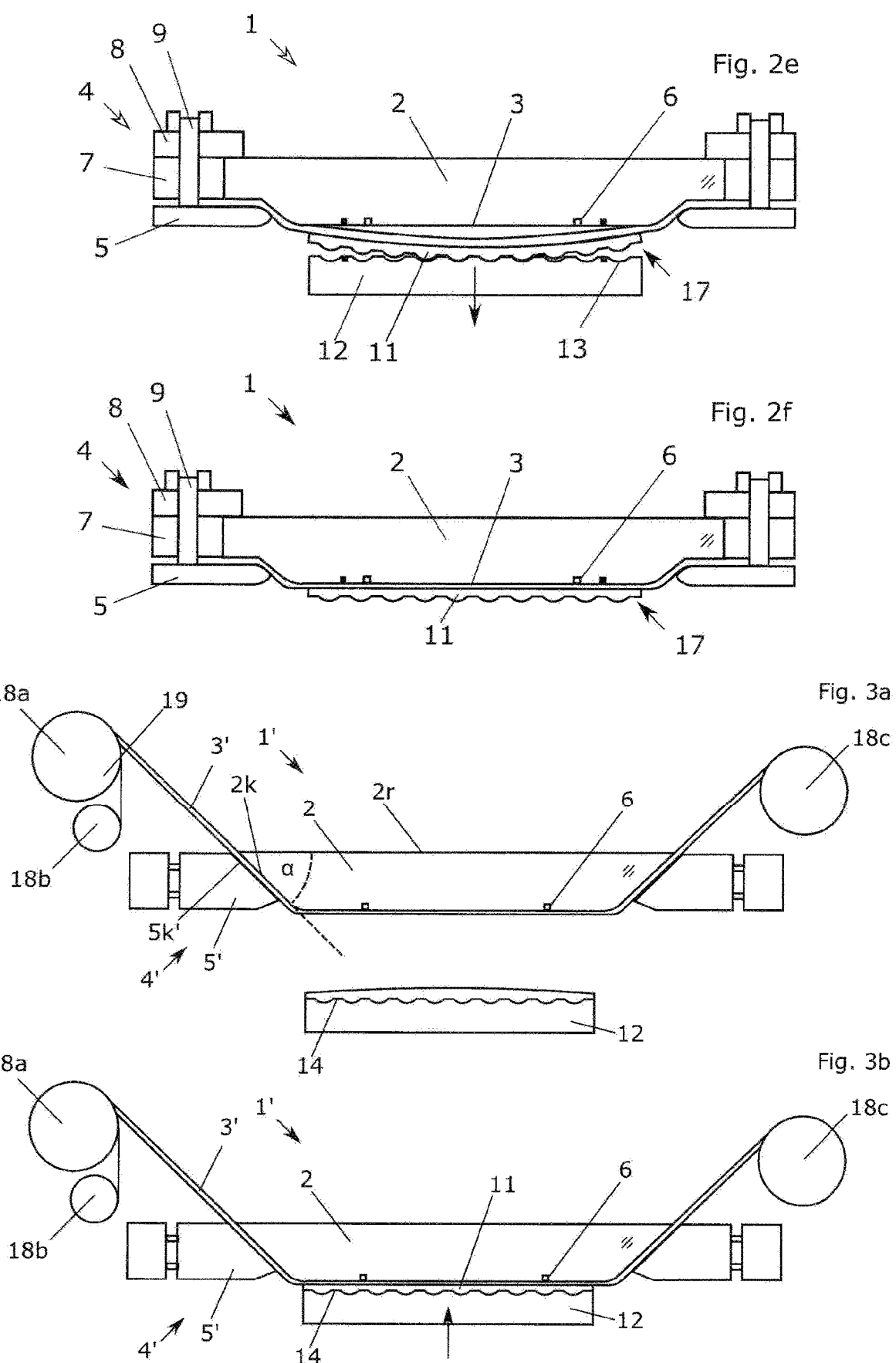
FIG. 2e shows a fifth process step of the first inventive process.
FIG. 2f shows a sixth process step of the first inventive process.
FIG. 3a shows a second process step of the second inventive process.
FIG. 3b shows a third process step of the second inventive process.

FIG. 2*e* shows a fifth inventive process step of a first inventive method, in which the inventive detachment of the stamp 17 produced according to the invention (also called working stamp hereunder) takes place. During this procedure the carrier 3 is removed from the carrier form element 2. Removal is in particular effected with the aid of an overpressure of a fluid, which is emitted through the dynamic carrier fixing 6, which is realised as a vacuum path. It is also feasible that there are elements, which are independent of the dynamic carrier fixing 6 and which can cause the carrier 3 and thus the stamp 17 to bend in a corresponding manner. Additionally installed jets would for example be feasible. Another possibility would be to charge the carrier 3 electrostatically with a second potential of the same polarity causing the carrier 3 to be separated from the carrier form element 2 through elements in the carrier form element 2. According to the invention the hardened working stamp embossing material 11 is detached from the master stamp 12 from outside to inside, in particular sequentially. Due to this kind of demoulding the hardened embossing material 11 is detached in a very careful manner from the master stamp structures 13 of the master stamp 12. The stamp 17 produced in this way can thus be produced in a faultless manner.

FIG. 2*f* shows a sixth inventive process step, in which the carrier 3, which with the hardened embossing material 11 forms the stamp 17, is again fully fixed on the carrier form element 2. Fixing is again effected via the dynamic carrier fixing 6. The stamp 17 produced in this way can now be used for a stamping process of an embossing material. Demoulding of the stamp 17 from an embossing material in a subsequent stamping process can be done in exactly the same manner as demoulding the stamp 17 from the master stamp 12 as per FIG. 2*e*.

FIG. 3*a* shows a second inventive process step with a second inventive stamping device 1'. The first inventive process step is analogous to the process step in FIG. 2*a* and is therefore not repeated here. The second inventive stamping device 1' is a device with a roll system. A carrier 3', which can be coated with a protective film 19, has been placed on a roll 18*a*. In contrast to the carrier 3 of the first inventive embodiment the carrier 3' is an "endless film". The carrier 3' is tensioned via the carrier form element 2 and wound onto a roll 18*c*. The protective film 19 can be pulled off and wound onto a roll 18*b*. The fixing units 4' are designed in such a way that they can clamp the carrier 3', in particular laterally. Clamping the carrier 3' is preferably effected by an angles static carrier fixing 5', the clamping surface 5*k'* of which is parallel to a carrier form element clamping surface 2*k* opposite thereof. The angle α between the carrier form element clamping surface 2*k* and a carrier form element back 2*r* is between 0° and 90°, preferably between 5° and 85°, more preferably between 10° and 80°, even more preferably between 15° and 75°, most preferably between 20° and 70°. With the inventive embodiment the master stamp 12 is preferably moved below the stamping device.

FIG. 3*b* shows a third inventive process step with the second inventive stamping device 1'. Since the stamping device 1' is preferably designed so as to be stationary as a whole, the master stamp 12 moves towards the carrier 3' in order to bring the working stamp embossing material 11 into contact with the carrier 3'.

Figures 3C, 3D, 3E, 3F:
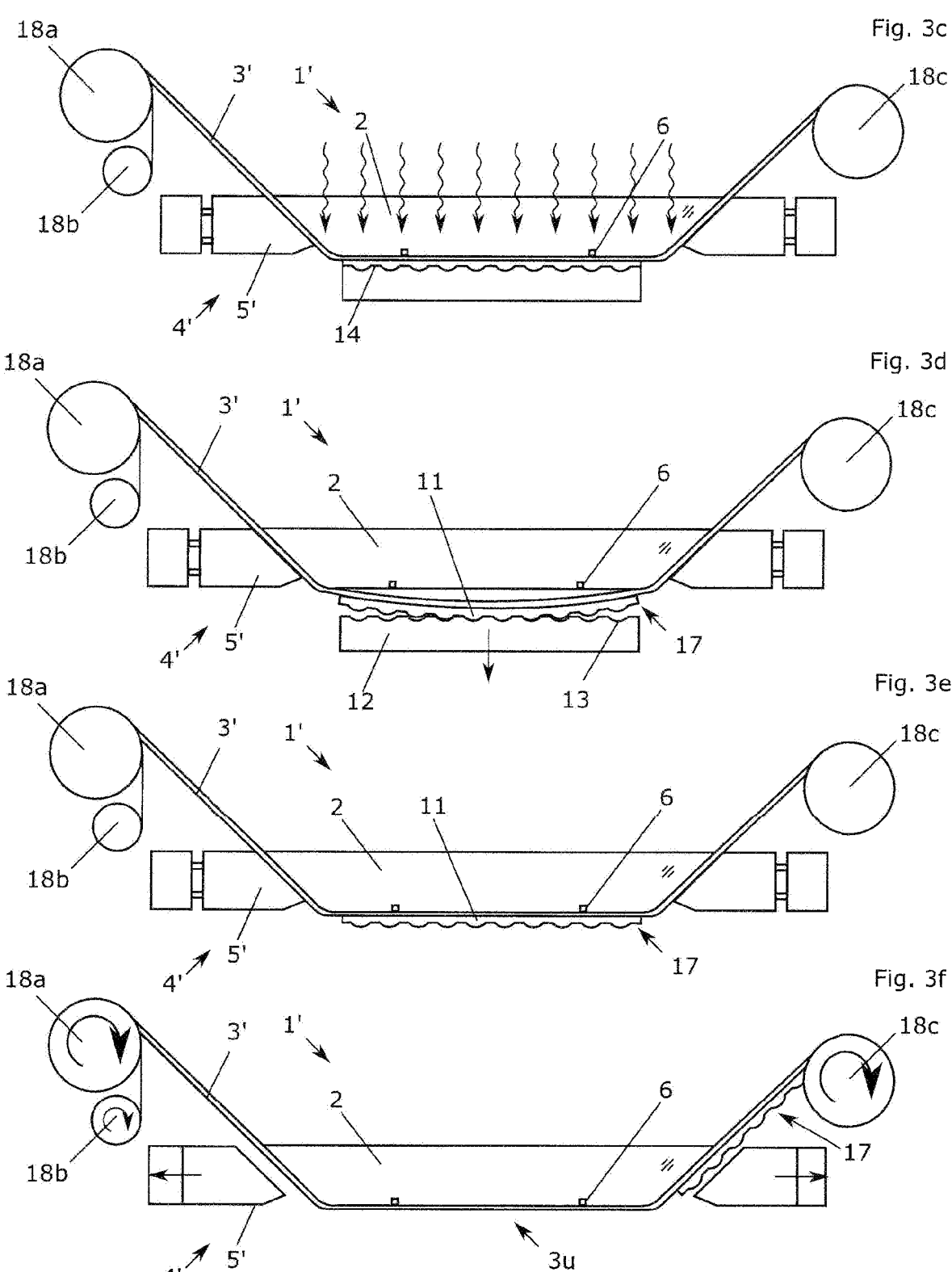
FIG. 3c shows a fourth process step of the second inventive process.
FIG. 3d shows a fifth process step of the second inventive process.
FIG. 3e shows a sixth process step of the first inventive process.
FIG. 3f shows a seventh process step of the second inventive process.

FIG. 3*c* shows a fourth inventive process step with the second inventive stamping device analogous to the process step in FIG. 2*d*.

FIG. 3*d* shows a fifth inventive process step with the second inventive stamping device 1' analogous to the process step in FIG. 2*e*.

FIG. 3*e* shows a sixth inventive process step with the second inventive stamping device 1' analogous to the process step in FIG. 2*f*.

FIG. 3*f* shows a seventh inventive process step with the second inventive stamping device 1', in which the fixing units 4' are opened, so that the carrier 3 can be moved further on by the rolls 18*a*, 18*c*. According to the invention this includes removing the working stamp 17 from the carrier form element 2. Due to the carrier 3 being wound onto the roll 18*c* a new unused section 3*u* of the carrier 3 is moved underneath the carrier form element 2 and can again be provided with an embossing material according to the process steps 3*a*-3*d*.

LIST OF REFERENCE SYMBOLS

1, 1' stamping device
2 carrier form element
2*e* carrier form element elevation
2*o* carrier form element surface
2*r* carrier form element back
2*k* carrier form element clamping surface
3, 3' carrier
3*u* unused carrier section
3*s* carrier stamp side
4, 4' fixing unit
5, 5' static carrier fixing
5*k'* clamping surface
6 dynamic carrier fixing/fixing elements
7 distance piece
8 top part
9 fixing element
10 separating device
11 working stamp embossing material
12 master stamp
12*o* master stamp surface
13 master stamping structure
14 alignment mark
15 alignment element

16 stamping area

17 stamp/working stamp

18*a*, 18*b*, 18*a* c roll

19 protective film

α angle

What is claimed is:

1. A device for detaching a stamp from a substrate, comprising:

a carrier in contact with the stamp; and a carrier form element configured to deform and tension the carrier in contact with the stamp to deform the stamp in a direction of the substrate in order to detach the stamp in contact with the carrier from the substrate, the carrier form element comprising:

at least one carrier form element elevation over which the carrier is stretched and in contact therewith, the carrier form element elevation being configured to lift a carrier stamp side of the carrier off of a remaining part of the carrier form element when the carrier is tensioned; and at least one fixing element configured to fix the carrier and deliver a gas and/or a gas mixture to an intermediate space between the carrier form element and the carrier.

* * * * *